(12) United States Patent
Yamazaki et al.

(10) Patent No.: US 9,762,840 B2
(45) Date of Patent: Sep. 12, 2017

(54) IMAGING DEVICE AND METHOD OF DRIVING THE SAME (71) Applicant: CANON KABUSHIKI KAISHA, Tokyo (JP)

(72) Inventors: Kazuo Yamazaki, Yokohama (JP); Seiichirou Sakai, Yokohama (JP); Yu Maehashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 73 days.

(21) Appl. No.: 14/710,084

(22) Filed: May 12, 2015

(65) Prior Publication Data
US 2015/0341580 A1 Nov. 26, 2015

(30) Foreign Application Priority Data

May 23, 2014 (JP) .................................. 2014-106770

(51) Int. Cl.
*H04N 5/378* (2011.01)
*H04N 5/374* (2011.01)
(Continued)

(52) U.S. Cl.
CPC ......... *H04N 5/378* (2013.01); *H04N 5/23212* (2013.01); *H04N 5/341* (2013.01);
(Continued)

(58) Field of Classification Search
CPC ...... H04N 5/378; H04N 5/3741; H04N 5/341; H04N 5/37457; H04N 5/343;
(Continued)

(56) References Cited

U.S. PATENT DOCUMENTS 4,663,669 A 5/1987 Kinoshita et al.
4,774,585 A 9/1988 Suga et al.
(Continued)

FOREIGN PATENT DOCUMENTS

JP 2012-191401 A 4/2012
JP 2013-211833 A 10/2013

OTHER PUBLICATIONS

U.S. Appl. No. 14/663,592, Hideo Kobayashi, filed Mar. 20, 2015.
U.S. Appl. No. 14/748,483, Seiichirou Sakai, filed Jun. 24, 2015.

*Primary Examiner* — Luong T Nguyen
(74) *Attorney, Agent, or Firm* — Fitzpatrick, Cella, Harper & Scinto (57) ABSTRACT

In an imaging device including a pixel array in which a plurality of pixels is arranged, each of the pixels including first and second photoelectric conversion units, and a micro lens that collects incident light to the first and second photoelectric conversion units, in a first frame period, a first signal based on a signal electric charge generated in the first photoelectric conversion unit and a second signal based on a signal electric charge generated in at least the second photoelectric conversion unit are read out from a plurality of pixels included in a part of the pixel array, and in a second frame period, a third signal based on the signal electric charges generated in the first and the second photoelectric conversion units is read out from a plurality of pixels included in another part of the pixel array.

11 Claims, 8 Drawing Sheets

(51) Int. Cl.
- *H04N 5/341* (2011.01)
- *H04N 5/232* (2006.01)
- *H04N 5/343* (2011.01)
- *H04N 5/369* (2011.01)
- *H04N 5/3745* (2011.01)

(52) U.S. Cl.
CPC ........... *H04N 5/343* (2013.01); *H04N 5/3696* (2013.01); *H04N 5/3741* (2013.01); *H04N 5/37457* (2013.01)

(58) Field of Classification Search
CPC ............. H04N 5/3696; H04N 5/23212; H04N 5/23355; H04N 5/23229
See application file for complete search history.

(56) References Cited

U.S. PATENT DOCUMENTS

| | | | |
|---|---|---|---|
| 7,423,790 B2 | 9/2008 | Kochi et al. | |
| 7,629,568 B2 | 12/2009 | Koizumi et al. | |
| 7,751,700 B2* | 7/2010 | Kusaka | G03B 13/28 348/345 |
| 7,816,755 B2 | 10/2010 | Yamazaki et al. | |
| 8,049,799 B2 | 11/2011 | Sonoda et al. | |
| 8,106,343 B2 | 1/2012 | Arishima et al. | |
| 8,325,260 B2 | 12/2012 | Yamazaki et al. | |
| 8,582,003 B2 | 11/2013 | Sakai | |
| 8,598,901 B2 | 12/2013 | Hiyama et al. | |
| 8,638,381 B2* | 1/2014 | Murata | G02B 3/0056 348/272 |
| 8,711,259 B2 | 4/2014 | Maehashi et al. | |
| 8,760,337 B2 | 6/2014 | Yamazaki | |
| 8,836,313 B2 | 9/2014 | Takagi et al. | |
| 8,872,092 B2 | 10/2014 | Ryoki et al. | |
| 9,060,139 B2 | 6/2015 | Yamazaki | |
| 9,093,351 B2 | 7/2015 | Sakai et al. | |
| 9,225,923 B2* | 12/2015 | Hashimoto | H04N 5/3696 |
| 2010/0176273 A1* | 7/2010 | Shimoda | H01L 27/14623 250/208.1 |
| 2015/0077607 A1 | 3/2015 | Yamazaki et al. | |
| 2015/0215561 A1 | 7/2015 | Maehashi et al. | |

* cited by examiner

IMAGING DEVICE AND METHOD OF DRIVING THE SAME

BACKGROUND OF THE INVENTION

Field of the Invention

The present invention relates to an imaging device that outputs focal point detection information and image information, and a method of driving the imaging device.

Description of the Related Art

As an imaging device in a phase difference detection system, which outputs a signal that can be used for focal point detection, an imaging device having pixels arranged in a two-dimensional matrix manner, the pixels having a pair of photoelectric conversion units arranged under a micro lens, is proposed.

Japanese Patent Application Laid-Open No. 2013-211833 describes an imaging device in which a focal point detection region from which both of the focal point detection information and the image information are acquired, and an image region from which only the image information is acquired, are provided to an imaging region. The imaging device reads out, from pixels in the focal point detection region, a signal (A signal) based on only one of the pair of photoelectric conversion units, and a signal ((A+B) signal) based on electric charges caused in both of the pair of photoelectric conversion units. Following that, the imaging device calculates these signals to acquire a signal (B signal) based on only the other photoelectric conversion unit of the pair of photoelectric conversion units, and performs the focal point detection using the A signal and the B signal. The (A+B) signal is used as an image signal as it is. Further, only the (A+B) signal is read out without reading out the A signal from pixels of the image region, whereby a decrease in a read time is realized.

However, a larger number of noise components are superimposed on the (A+B) signal read out from the focal point detection region than the (A+B) signal read out from the image region, and thus image quality may be deteriorated. Further, it is necessary to change a method of scanning rows between in the focal point detection region and in the image region in one frame period, and thus a control method is difficult.

SUMMARY OF THE INVENTION

An object of the present invention is to provide an imaging device that can easily read out a focal point detection signal and an image acquisition signal without deteriorating the image quality, and a method of driving the imaging device.

According to one aspect of the present invention, there is provided a method of driving an imaging device including a pixel array in which a plurality of pixels is arranged, each of the pixels including a first photoelectric conversion unit, a second photoelectric conversion unit, and a micro lens that collects incident light to the first photoelectric conversion unit and the second photoelectric conversion unit, the method including reading out a first signal based on a signal electric charge generated in the first photoelectric conversion unit, and a second signal based on a signal electric charge generated in at least the second photoelectric conversion unit, from each of a plurality of pixels included in a part of the pixel array, in a first frame period, and reading out a third signal based on the signal electric charge generated in the first photoelectric conversion unit and the signal electric charge generated in the second photoelectric conversion unit, from each of a plurality of pixels included in another part of the pixel array, and from which the signals based on the signal electric charges have not been read out in the first frame period, in a second frame period other than the first frame period.

According to another aspect of the present invention, there is provided an imaging device including a pixel array in which a plurality of pixels is arranged, each of the pixel including a first photoelectric conversion unit, a second photoelectric conversion unit, and a micro lens that collects incident light to the first photoelectric conversion unit and the second photoelectric conversion unit, and a signal processing unit configured to execute a first frame period in which a first signal based on a signal electric charge generated in the first photoelectric conversion unit, and a second signal based on a signal electric charge generated in at least the second photoelectric conversion unit are read out from each of a plurality of pixels included in a part of the pixel array, and a second frame period other than the first frame period, and in which a third signal based on the signal electric charge generated in the first photoelectric conversion unit and the signal electric charge generated in the second photoelectric conversion unit is read out from each of a plurality of pixels included in another part of the pixel array, and from which the signals based on the signal electric charges have not been read out in the first frame period.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

An imaging device and a method of driving the imaging device according to a first embodiment of the present invention will be described with reference to FIGS. 1 to 5B.

Figure 1:
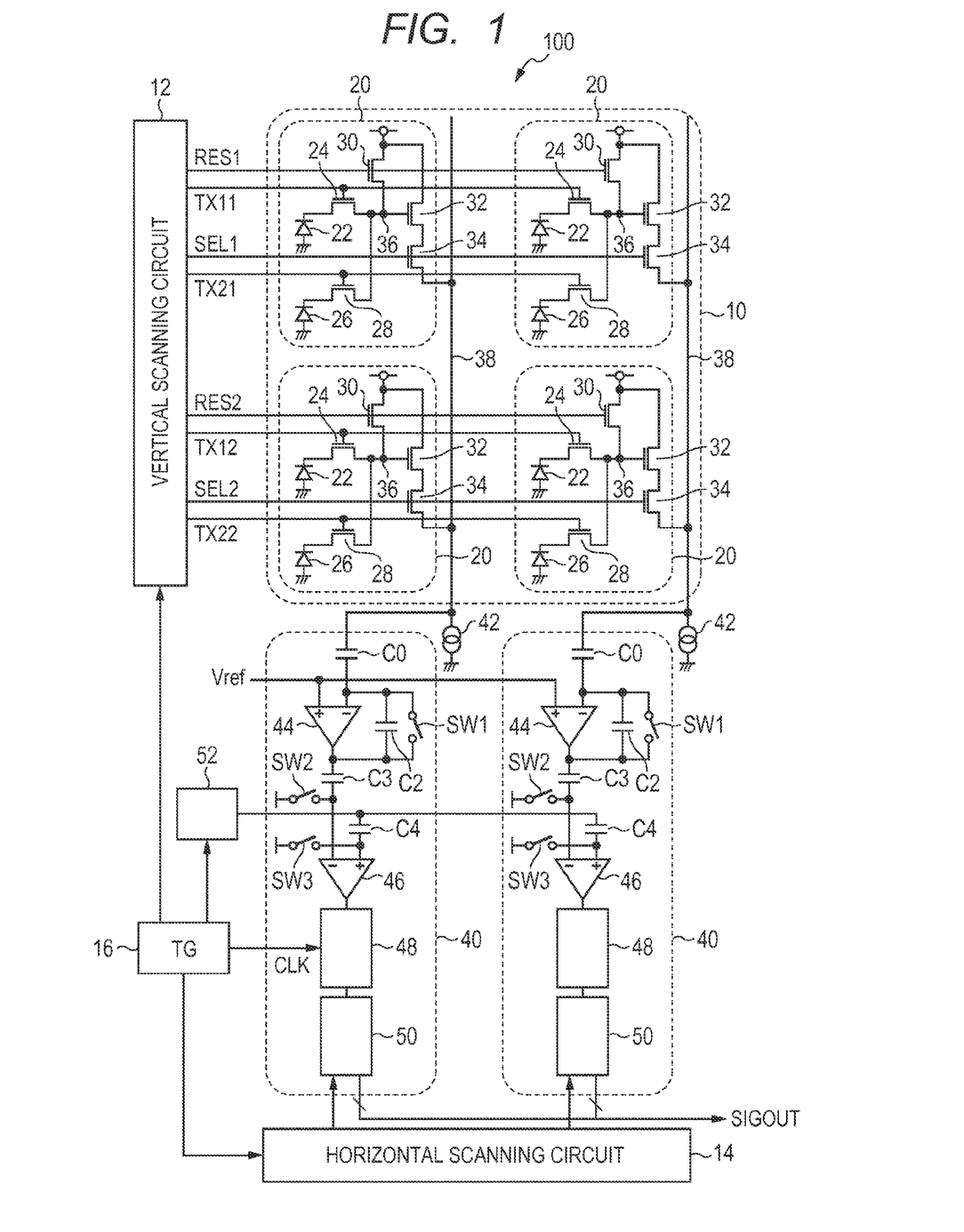
FIG. 1 is a circuit diagram illustrating a configuration of an imaging device according to a first embodiment of the present invention.

FIG. 1 is a circuit diagram illustrating a configuration of an imaging device according to the present embodiment.

Figure 2A:
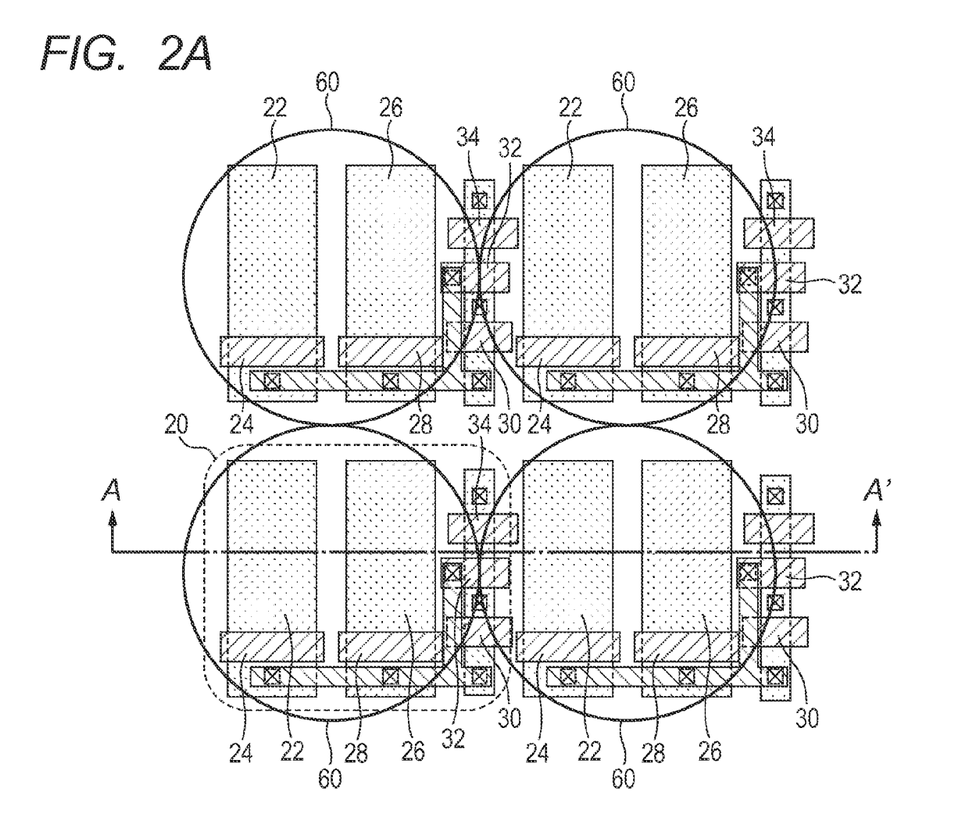
FIG. 2A is a plan view illustrating a configuration of a pixel unit of the imaging device according to the first embodiment of the present invention.
Figure 2B:
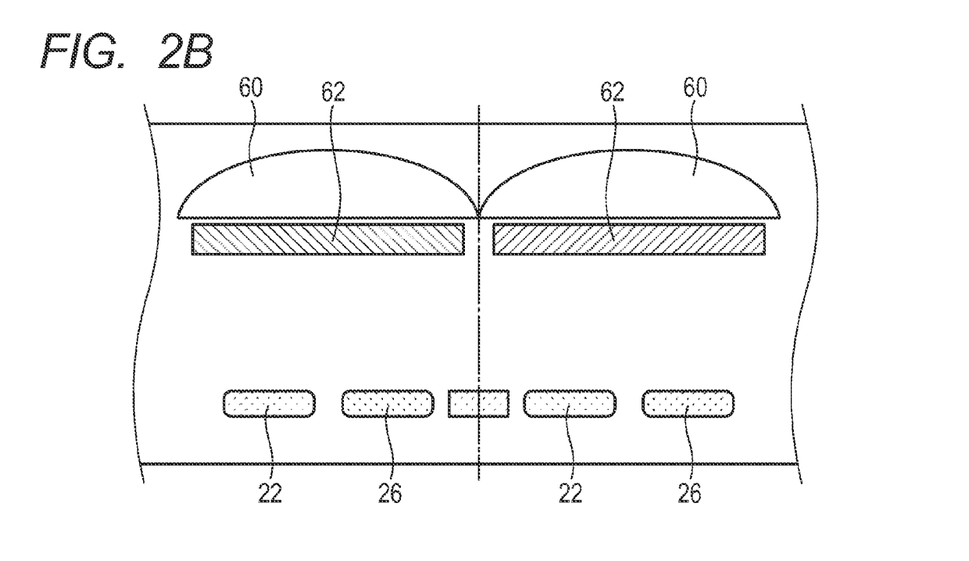
FIG. 2B is a cross-sectional view illustrating the configuration of the pixel unit of the imaging device according to the first embodiment of the present invention.

FIG. 2A is a plan view illustrating a configuration of pixels of the imaging device according to the present embodiment. FIG. 2B is a cross-sectional view illustrating the configuration of the pixels of the imaging device according to the present embodiment. FIGS. 3 to 5B are timing charts illustrating a method of driving the imaging device according to the present embodiment.

First, an outline of the configuration of the imaging device according to the present embodiment will be described with reference to FIGS. 1, 2A, and 2B.

An imaging device 100 according to the present embodiment includes, as illustrated in FIG. 1, a pixel array 10, signal processing circuits 40, a vertical scanning circuit 12, a horizontal scanning circuit 14, a timing generator (hereinafter, expressed as "TG") 16, and a ramp signal generating circuit 52.

The pixel array 10 includes a plurality of pixels 20 arranged in a two-dimensional matrix manner along a row direction and a column direction. FIG. 1 illustrates the pixel array 10 of 2 rows×2 columns for simplification of the drawing. However, the number of pixels 20 arranged in the row direction and the column direction is not especially limited. Note that, in the present specification, the row direction represents a transverse direction in the drawing, and the column direction represents a vertical direction in the drawing. In an example, the row direction corresponds to a horizontal direction in the imaging device, and the column direction corresponds to a vertical direction in the imaging device.

Each of pixels 20 includes photodiodes 22 and 26, transfer MOS transistors 24 and 28, a reset MOS transistor 30, an amplifier MOS transistor 32, and a select MOS transistor 34.

An anode of the photodiode 22 that configures a first photoelectric conversion unit is connected to a ground voltage line, and a cathode is connected to a source of the transfer MOS transistor 24. An anode of the photodiode 26 that configures a second photoelectric conversion unit is connected to the ground voltage line, and a cathode is connected to a source of the transfer MOS transistor 28. Drains of the transfer MOS transistors 24 and 28 are connected to a source of the reset MOS transistor 30 and a gate of the amplifier MOS transistor 32. A connection node of the drains of the transfer MOS transistors 24 and 28, the source of the reset MOS transistor 30, and the gate of the amplifier MOS transistor configures a floating diffusion region (hereinafter, referred to as "FD region") 36. Drains of the reset MOS transistor 30 and the amplifier MOS transistor 32 are connected to a power source voltage line. A source of the amplifier MOS transistor 32 is connected to a drain of the select MOS transistor 34. The transfer MOS transistors 24 and 28, the reset MOS transistor 30, the amplifier MOS transistor 32, and the select MOS transistor 34 configure an in-pixel readout circuit for reading out pixel signals based on electric charges generated in the photodiodes 22 and 26.

Note that the names of a source and a drain of a transistor may sometimes differ depending on a conductive type, a focused function, or the like of the transistor, and may be called opposite names to the above-described source and drain.

FIG. 2A is a top view schematic diagram of the pixel array 10, and FIG. 2B is an A-A' line cross-sectional view of FIG. 2A. The pixel array 10 having the circuit configuration illustrated in FIG. 1 can be realized in a plan layout illustrated in FIG. 2A, for example. A unit region surrounded by the dotted line in FIG. 2A is a unit pixel (pixel 20). A micro lens 60 is provided over each pixel 20. A color filter 62 is provided between the photodiodes 22 and 26, and the micro lens 60, as illustrated in FIG. 2B.

In the present specification, when the photodiodes 22 and 26 included in one pixel 20 are collectively described, they are written as "light-receiving unit". One micro lens 60 is arranged to cover one light-receiving unit, and collects a luminous flux to the light-receiving unit. That is, one micro lens 60 is provided corresponding to one light-receiving unit. Further, light collected by one micro lens 60 is incident on a plurality of photoelectric conversion units included in the pixel 20 provided corresponding to the one micro lens 60. The imaging device 100 of the present embodiment includes a micro lens array including a plurality of micro lenses 60.

A signal line TX1, a signal line TX2, a signal line RES, and a signal line SEL are arranged extending in the row direction, in each row of the pixel array 10. The signal line TX1 is connected to gates of the transfer MOS transistors 24 of the pixels 20 arranged in the row direction, and forms a signal line common to these pixels 20. The signal line TX2 is connected to gates of the transfer MOS transistors 28 of the pixels 20 arranged in the row direction, and forms a signal line common to these pixels 20. The signal line RES is connected to gates of the reset MOS transistors 30 of the pixels 20 arranged in the row direction, and forms a signal line common to these pixels 20. The signal line SEL is connected to gates of the select MOS transistors 34 of the pixels 20 arranged in the row direction, and forms a signal line common to these pixels 20. Note that, in FIG. 1, reference numerals corresponding to row numbers are respectively attached to the names of the respective signal lines (for example, RES1, RES2, TX11, and TX12).

The vertical scanning circuit 12 selects the pixels 20 in every row one by one, based on a timing signal from the TG 16, and outputs pixel signals from the pixels 20. The signal line TX1, the signal line TX2, the signal line RES, and the signal line SEL are connected to the vertical scanning circuit 12. A transfer pulse signal PTX1 for driving the transfer MOS transistors 24 is output from the vertical scanning circuit 12 to the signal line TX1. A transfer pulse signal PTX2 for driving the transfer MOS transistors 28 is output from the vertical scanning circuit 12 to the signal line TX2. A reset pulse signal PRES for driving the reset MOS transistors 30 is output from the vertical scanning circuit 12 to the signal line RES. A select pulse signal PSEL is output from the vertical scanning circuit 12 to the signal line SEL. When a High level (hereinafter, written as "H-level") signal is applied to these signal lines, the corresponding transistor becomes a conductive state (ON state). Further, when a Low level (hereinafter, written as "L-level") signal is applied, the corresponding transistor becomes a non-conductive state (OFF state).

A vertical signal line 38 is arranged extending in the column direction, in each column of the pixel array 10. The vertical signal line 38 is connected to sources of the select MOS transistors 34 of the pixels 20 arranged in the column direction, and forms a signal line common to these pixels 20. The signal processing circuit 40 and a current source 42 are connected to the vertical signal line 38 of each column.

The signal processing circuit 40 processes the pixel signals output from the pixel array 10. The signal processing circuit 40 includes, as illustrated in FIG. 1, clamp capacitors C0, C3, and C4, a feedback capacitor C2, switches SW1, SW2, and SW3, an operational amplifier 44, a comparison circuit 46, a counter circuit 48, and a memory 50.

An inverting input terminal of the operational amplifier 44 is connected to the vertical signal line 38 through the clamp capacitor C0. A reference voltage Vref is provided to a non-inverting input terminal of the operational amplifier 44. The feedback capacitor C2 and the switch SW1 are connected in parallel between the inverting input terminal and an output terminal of the operational amplifier 44. The output terminal of the operational amplifier 44 is connected to one of input terminals of the comparison circuit 46 through the clamp capacitor C3. The switch SW2 is connected between a connection node between the clamp capacitor C3 and the comparison circuit 46, and a fixed voltage line (for example, the power source voltage line). The ramp signal generating circuit 52 is connected to the other input terminal of the comparison circuit 46 through the clamp capacitor C4. The ramp signal generating circuit 52 is a circuit for generating a ramp signal used in processing of the pixel signals in the signal processing circuit 40, based on a timing signal from the TG 16. The switch SW3 is connected between a connection node between the clamp capacitor C4 and the comparison circuit 46, and a fixed voltage line (for example, the power source voltage line). The counter circuit 48 is connected to an output terminal of the comparison circuit 46. The TG 16 and the memory 50 are connected to the counter circuit 48. The horizontal scanning circuit 14 is connected to the memory 50.

Switch pulse signals PSW1, PSW2, and PSW3 for switching ON/OFF of the switches are respectively applied to the switches SW1, SW2, and SW3. When these signals are H-level signals, the corresponding switches become a conductive state (ON state), and when these signal lines are L-level signals, the corresponding switches become a non-conductive state (OFF state).

Next, a method of driving the imaging device according to the present embodiment will be described with reference to FIGS. 1 to 5B.

A method of driving the imaging device according to the present embodiment includes a step of executing a frame period in which a focal point detection signal and an image acquisition signal are read out, and a step of executing a frame period in which only the image acquisition signal is read out.

First, a readout operation in the frame period in which a focal point detection signal and an image acquisition signal are read out will be described with reference to FIG. 3. Note that, in FIG. 3, a signal HD represents an identification signal of a row, a signal V1 represents an output of the operational amplifier 44, a signal VRAMP represents a ramp signal output from the ramp signal generating circuit 52, and a signal LAT represents a latch signal output from the comparison circuit 46.

First, at time t11, the signal HD is caused to be an H-level signal, and the readout operation from the first-row pixels 20 is started.

In response to the signal HD, at the same time t11, the vertical scanning circuit 12 outputs the H-level reset pulse signal PRES to the signal line RES to cause the reset MOS transistors 30 to become the ON state. Accordingly, input nodes of the amplifier MOS transistors 32 are electrically connected to the power source voltage line through the reset MOS transistors 30, so that the input nodes of the amplifier MOS transistors 32 are reset to an electric potential of a reset level.

Further, at the same time t11, the vertical scanning circuit 12 outputs the H-level select pulse signal PSEL to the signal line SEL to cause the select MOS transistors 34 to become the ON state. Accordingly, the amplifier MOS transistors 32 become a state where the sources are supplied with a bias current from the current sources 42 through the vertical signal lines 38 and the select MOS transistors 34, and configure source follower circuits. Then, accordingly, pixel signals of when the input nodes of the amplifier MOS transistors 32 have the electric potential of the reset level are output to the vertical signal lines 38 through the select MOS transistors 34.

Further, at the same time t11, the switch pulse signals PSW1, PSW2, and PSW3 are caused to be H-level signals, and the switches SW1, SW2, and SW3 are caused to become the ON state. Accordingly, output terminals and input terminals of the operational amplifiers 44 are caused to be a short-circuit state and the operational amplifiers 44 are reset, and the clamp capacitors C4 and C3 are reset.

Then, at time t12, the reset pulse signal PRES is caused to be an L-level signal, and the reset MOS transistors 30 are caused to be the OFF state. When the reset pulse signal PRES makes a transition from the H-level to the L-level signal, the electric potential of the input nodes of the amplifier MOS transistors 32 is changed due to charge injection caused in the reset MOS transistors 30. Accordingly, the signal level of the pixel signals output to the vertical signal lines 38 is also changed. Hereinafter, the pixel signals output at time t12 are written as "N signals." Further, at the same time t12, the switch pulse signals PSW1, PSW2, and PSW3 are caused to be L-level signals. Accordingly, electric potential of when the switch pulse signals PSW1, PSW2, and PSW3 are the L-level signals is held in each of the clamp capacitors C0, C3, and C4.

The pixel signals from the pixels 20 output to the vertical signal lines 38 are input to the inverting input terminals of the operational amplifiers 44 through the clamp capacitors C0. Accordingly, the operational amplifiers 44 amplify the pixel signals provided from the vertical signal lines 38 through the clamp capacitors C0, and output the amplified signals to the clamp capacitors C3. At this time, since the feedback capacitor C1 is connected to a feedback path of the operational amplifier 44, a gain is determined according to a ratio of the clamp capacitor C0 and the feedback capacitor C2. The signals provided to the clamp capacitors C3 are obtained such that offset signals Voff of the operational amplifiers 44 are superimposed on the signals amplified by the operational amplifier 44, the signals being input from the pixels 20 through the clamp capacitors C0. The signals output from the operational amplifiers 44 are input to the comparison circuits 46 through the clamp capacitors C3.

Then, at time t13, the ramp signal generating circuit 52 starts to increase a ramp signal VRAMP to be supplied to the comparison circuits 46 through the clamp capacitors C4. Here, the ramp signal VRAMP is a signal with a voltage value gradually changed (increased) depending on time. The ramp signal VRAMP is an example of a reference signal compared with an analog signal in the comparison circuits 46.

The comparison circuits 46 start a comparison operation between the signals input from the operational amplifiers 44 through the clamp capacitors C3, and the ramp signals VRAMP supplied from the ramp signal generating circuit 52 through the clamp capacitors C4. The comparison circuits 46 output latch signals LAT, which are signals based on comparison results, to the counter circuits 48. That is, the comparison circuits 46 change the signal level of the latch signals LAT to be output to the counter circuits 48 from the L-level to the H-level when magnitude relation of the ramp signals VRAMP and the signals output from the operational amplifiers 44 is reversed.

Clock pulse signals CLK are input from the TG 16 to the counter circuits 48. The counter circuits 48 start to count the clock pulse signal CLK at the same time as the ramp signal generating circuit 52 starts to increase a voltage value of the ramp signal VRAMP, and output a count signal, which is a count result, to the memories 50. Then, when the latch signals LAT output from the comparison circuits 46 are changed to the H-level signals, the counter circuits 48 terminate the counting of the clock pulse signal CLK, and the memories 50 hold the count signals of when the latch signals LAT are changed.

For example, assume that the magnitude relation of the signals input from the operational amplifiers 44 through the clamp capacitors C3, and the ramp signals VRAMP input through the clamp capacitors C4 is reversed at time t14. Then, the comparison circuits 46 output H-level latch signals LAT to the counter circuits 48. The counter circuits 48 that have received the H-level latch signals LAT stop the outputs of the count signals to the memories 50. The memories 50 hold the count signals of time t14. The ramp signal generating circuit 52 terminates the increase of the ramp signals VRAMP at time t15. Note that, in the present example, the counter circuits 48 that have received the H-level latch signals LAT stop the outputs of the count signals to the memories 50. However, the counter circuits 48 may be configured to stop the count operations upon receipt of the H-level latch signals LAT. The same applies to operations described below.

Note that a period in which the ramp signals VRAMP are changed is shortened in the case where the N signals are converted into digital signals, compared with a case where S signals are converted into digital signals, described below. This is because, typically, the N signal mainly contains a noise component and an offset component, and thus a signal range of the N signal is narrower than that of the S signal. Therefore, the period in which the ramp signals VRAMP are changed can be made shorter. In doing so, time required for a conversion operation of the pixel signals output by the pixels in one row can be shortened.

By the operations of the comparison circuits 46, the counter circuits 48, and the memories 50 performed from time t13 to t15, the analog signals output from the operational amplifiers 44 through the clamp capacitors C3 are converted into digital signals. The operations performed by the comparison circuits 46, the counter circuits 48, and the memories 50 from time t13 to t15 are hereinafter collectively called and written as "N conversion." The digital signals held in the memories 50 by the N conversion are digital N signals.

Then, at time t16, the vertical scanning circuit 12 outputs the H-level transfer pulse signal PTX1 to the signal line TX1 to cause the transfer MOS transistors 24 to become the ON state. Accordingly, signal electric charges generated in the photodiodes 22 by photoelectric conversion are transferred to the input nodes of the amplifier MOS transistors 32. Then, pixel signals based on the electric potential of the input nodes of the amplifier MOS transistors 32 according to the amount of the signal electric charges transferred from the photodiodes 22 are output to the vertical signal lines 38 through the select MOS transistors 34. These pixel signals are hereinafter written as "A signals."

In the present specification, a pixel signal output to the vertical signal line 38, based on the electric potential of the input node of the amplifier MOS transistor 32 that holds the signal electric charge that is photoelectrically converted incident light by the light-receiving unit, is hereinafter written as "S signal." The S signal includes the above-described A signal, and an (A+B) signal described below. In the method of driving the imaging device according to the present embodiment, the A signal and the (A+B) signal are output as the S signal in a time-division manner.

After the A signals are output from the pixels 20 to the clamp capacitors C0 through the vertical signal lines 38, the transfer pulse signal PTX1 is caused to be the L-level signal. The operational amplifiers 44 amplify the A signals input from the pixels 20 through the clamp capacitors C0, and output the amplified signals to the comparison circuits 46 through the clamp capacitors C3.

Then, at time t17, the ramp signal generating circuit 52 starts to increase the ramp signal VRAMP to be supplied to the comparison circuits 46 through the clamp capacitors C4. Further, the comparison circuits 46 start the comparison operations between the signals input from the operational amplifiers 44 through the clamp capacitors C3, and the ramp signals VRAMP. Further, the counter circuits 48 start to count the clock pulse signal CLK at the same time as the signal level of the ramp signals VRAMP is started to increase, similarly to the case of the N signal above.

For example, assume that magnitude relation between the signals input from the operational amplifiers 44 through the clamp capacitors C3, and the ramp signals VRAMP input through the clamp capacitors C4 is reversed at time t18. Then, the comparison circuits 46 output the H-level latch signals LAT to the counter circuits 48. The counter circuits 48 that have received the latch signals LAT stop the outputs of the count signals to the memories 50. The memories 50 hold the count signals of time t18. The ramp signal generating circuit 52 terminates the increase of the ramp signal VRAMP at time t19.

By the operations of the comparison circuits 46, the counter circuits 48, and the memories 50 performed from time t17 to t19, the analog signals output from the operational amplifiers 44 through the clamp capacitors C3 are converted into digital signals. The operations performed by the comparison circuits 46, the counter circuits 48, and the memories 50 from time t17 to t19 are hereinafter collectively called and written as "A conversion." The digital signals held in the memories 50 by the A conversion are digital A signals.

Then, at time t20, the digital N signals and the digital A signals held in the memories 50 are transferred from the memories 50 to an outside of the imaging device, as output signals SIGOUT. Here, the outside of the imaging device corresponds to, for example, an image signal processing unit 830 (see FIG. 8) of an imaging system 800 in a fourth embodiment described below. Note that the image signal processing unit 830 may be arranged on a part of the imaging device, that is, on the same chip as the imaging device. The horizontal scanning circuit 14 sequentially selects the memories 50 of the respective columns, based on the timing signal from the TG 16, and sequentially transfers the digital N signals and the digital A signals held in the memories 50 of the respective columns to the image signal processing unit 830.

Note that, in the present embodiment, the transfer of the digital N signals and the digital A signals to the outside of the imaging device is performed from time t20. However, the order of the transfer may be interchanged with an operation of time t21 described below. The transfer of the digital A signals and the digital N signals is favorably terminated by time t24 at which (A+B) conversion described below is terminated. Accordingly, transfer of digital (A+B) signals and digital N signals can be performed immediately after the termination of the (A+B) conversion. Therefore, the read time can be shortened.

Then, at time t21, the vertical scanning circuit outputs an H-level transfer pulse signal PTX2 to the signal line TX2 to cause the transfer MOS transistors 28 to become the ON state. Accordingly, signal electric charges generated in the photodiodes 26 by photoelectric conversion are transferred to the input nodes of the amplifier MOS transistors 32. At this time, the signal electric charges from the photodiodes 22 have already been held in the input nodes of the amplifier MOS transistors 32. Therefore, the transfer pulse signal PTX2 is caused to be the H-level signal, so that the signal electric charges from both of the photodiodes 22 and 26 are held in the FD regions 36. Then, as a result, pixel signals based on the electric potential of the input nodes of the amplifier MOS transistors 32 according to total amounts of the signal electric charges of the photodiodes 22 and 26 are output to the vertical signal lines 38 through the select MOS transistors 34. These pixel signals are hereinafter written as "(A+B) signals."

After the pixels 20 output the (A+B) signals to the clamp capacitors C0 through the vertical signal lines 38, the transfer pulse signal PTX2 is caused to be an L-level signal. The operational amplifiers 44 amplify the (A+B) signals input from the pixels 20 through the clamp capacitors C0, and output the amplified signals to the comparison circuits 46 through the clamp capacitors C3.

Then, at time t22, the ramp signal generating circuit 52 starts to increase the ramp signal VRAMP to be supplied to the comparison circuits 46 through the clamp capacitors C4. Further, the comparison circuits 46 start comparison operations between the signals input from the operational amplifiers 44 through the clamp capacitors C3, and the ramp signals VRAMP. Further, the counter circuits 48 start to count the clock pulse signal CLK at the same time as the signal level of the ramp signals VRAMP is started to change, similarly to the case of the N signal above.

For example, assume that magnitude relation between the signals input from the operational amplifiers 44 through the clamp capacitors C3, and the ramp signals VRAMP input through the clamp capacitors C4 is reversed at time t23. Then, the comparison circuits 46 output the H-level latch signals LAT to the counter circuits 48. The counter circuits 48 to which the latch signals LAT have been output stop the outputs of the count signals to the memories 50. The memories 50 hold the count signals of time t23. The ramp signal generating circuit 52 terminates changing of the ramp signal VRAMP at time t24.

By the operations of the comparison circuits 46, the counter circuits 48, and the memories 50 from time t22 to t24, the analog signals output from the operational amplifiers 44 through the clamp capacitors C3 are converted into digital signals. The operations performed by the comparison circuits 46, the counter circuits 48, and the memories 50 from time t22 to t24 are hereinafter collectively called and written as "(A+B) conversion." The digital signals held in the memories 50 by the (A+B) conversion are digital (A+B) signals.

Then, at time t25, the digital N signals obtained by the N conversion and the digital (A+B) signals obtained by the (A+B) conversion are transferred from the memories 50 to an outside of the imaging device, for example, to the image signal processing unit 830 described above, as output signals SIGOUT. The image signal processing unit 830 performs processing of obtaining a difference between the digital A signal and the digital N signal, and a difference between the digital (A+B) signal and the digital N signal, processing of calculating a difference between the digital (A+B) signal and the digital A signal to obtain a digital B signal, and the like.

Note that the digital B signal is a digital signal supposed to be obtained when the pixel signal based on the electric potential of the input node of the amplifier MOS transistor 32 according to the amount of the signal electric charge held only by the photodiode 26 is converted into a digital signal, similarly to the above-described AD conversion procedure.

In this way, the signals based on the signal electric charges generated in the photodiodes 22, the signals based on the signal electric charges generated in the photodiodes 26, and the signals based on the signal electric charges generated in the photodiodes 22 and 26 can be obtained.

The image signal processing unit 830 can perform focal point detection of a phase difference detection system using the digital A signal and the digital B signal. Further, the image signal processing unit 830 can form an image using the digital (A+B) signal. Further, the image signal processing unit 830 can decrease the noise components caused by the pixels 20, operational amplifiers 44, and the like, which are superimposed on the digital A signal and the digital (A+B) signal by subtracting the digital N signal from each of the digital A signal and the digital (A+B) signal. Such signal processing is so called correlated double sampling.

Following that, at time 26, the signal HD is caused to be the H-level signal, and the readout operation from the second-row pixels 20 and subsequent-row pixels is started, similarly to the above-described procedure.

In this way, readout of all of rows determined to obtain the focal point detection signal and the image acquisition signal is performed, and the series of readout operations in the frame period in which the focal point detection signal and the image acquisition signal are read out is completed.

Next, a readout operation in a frame period in which only the image acquisition signal is read out will be described with reference to FIG. 4. Note that, in FIG. 4, a signal HD represents an identification signal of a row, a signal V1 represents an output of the operational amplifier 44, a signal VRAMP represents a ramp signal output from the ramp signal generating circuit 52, and a signal LAT represents a latch signal output from the comparison circuit 46.

Even in the frame period in which only the image acquisition signal is read out, an operation procedure related to the N conversion is similar to the readout operation in the frame period in which the focal point detection signal and the image acquisition signal are read out. That is, respective operations from time t31 to t35 in the frame period in which only the image acquisition signal is read out are similar to those from time t11 to t15 in the frame period in which the focal point detection signal and the image acquisition signal are read out.

When only the image acquisition signal is read out, the transfer operation of the A signal at time t16 and the A conversion operation from time t17 to t19 in the frame period in which the focal point detection signal and the image acquisition signal are read out are not performed. Further, since the A conversion is not performed, the transfer operation of the digital A signal and the digital N signal at time t20 is also not performed. That is, an operation to output the (A+B) signals from the pixels 20 after the N conversion, and to obtain the digital (A+B) signals by the image signal processing unit 830 is performed.

To perform the operation, first, at time t36, the transfer pulse signals PTX1 and PTX2 are caused to be H-level signals, and the transfer MOS transistors 24 and 28 are caused to be the ON state. Accordingly, the signal electric charges generated in the photodiodes 22 and 26 by photoelectric conversion are transferred to the input nodes of the amplifier MOS transistors 32. Then, as a result, pixel signals, that is, the (A+B) signals, based on the electric potential of the input nodes of the amplifier MOS transistors 32 according to total amounts of the signal electric charges of the photodiodes 22 and 26 are output to the vertical signal line 38 through the select MOS transistors 34.

Hereinafter, an operation procedure related to (A+B) conversion for converting the (A+B) signal into a digital signal can be similar to the procedure of the (A+B) conversion in the frame period in which the focal point detection signal and the image acquisition signal are read out. That is, operations from time t37 to t39 in the frame period in which only the image acquisition signal is read out can be similar to the operations from time t22 to t24 in the frame period in which the focal point detection signal and the image acquisition signal are read out.

An operation to transfer the digital (A+B) signals obtained by the (A+B) conversion from the memories 50 performed at time t40 can also be similar to the operation at time t25 of the case where the focal point detection signal and the image acquisition signals are read out.

In this way, readout of all of rows determined to obtain only the image acquisition signal is performed, and the series of readout operations of the frame period in which only the image acquisition signal is read out is completed.

In the frame period in which only the image acquisition signal is read out, the readout operation of the A signals is not performed and the readout operation of only the (A+B) signals is performed. Therefore, the read time can be shortened in the frame period in which only the image acquisition signal is read out because the readout operation of the A signals and the A conversion operation are not performed, compared with the frame period in which the focal point detection signal and the image acquisition signal are read out.

Figure 3:
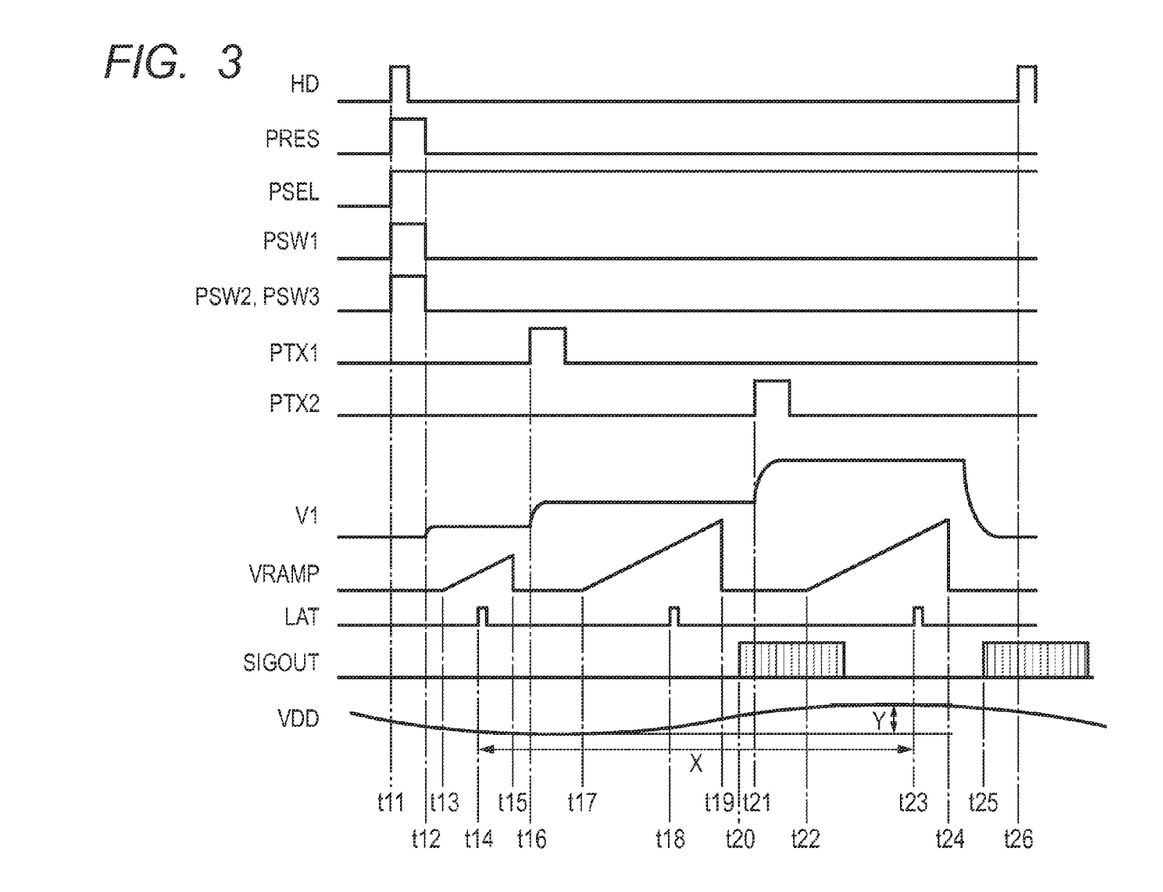
FIGS. 3, 4, 5A, and 5B are timing charts illustrating a method of driving the imaging device according to the first embodiment of the present invention.
Figure 4:
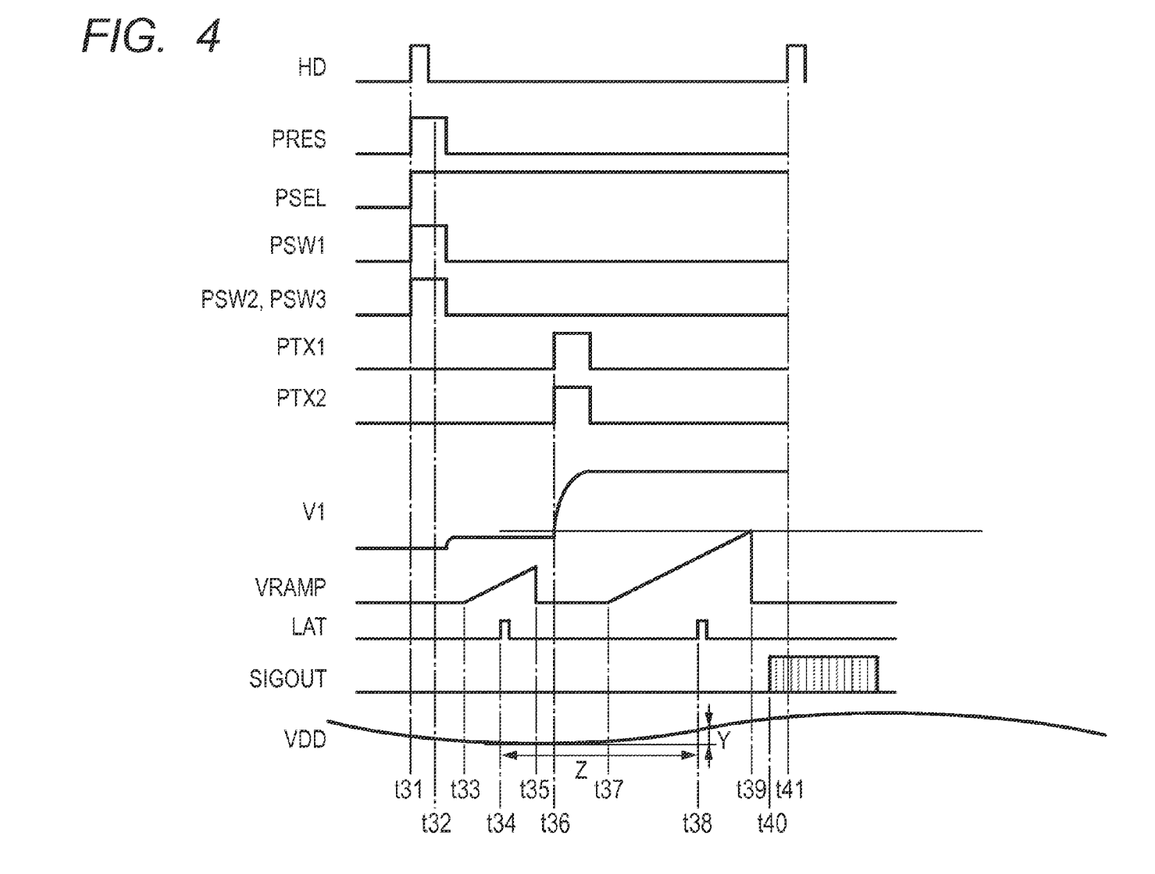

Here, focusing on a period X illustrated in FIG. 3 and a period Z illustrated in FIG. 4. The period X is a period from the AD conversion of the N signals to the AD conversion of the (A+B) signals in the frame period in which the focal point detection signal and the image acquisition signal are read out. The period Z is a period from the AD conversion of the N signals to the AD conversion of the (A+B) signals in the frame period in which only the image acquisition signal is read out. As is clear from comparison between FIGS. 3 and 4, the period Z in the frame period in which only the image acquisition signal is read out is shorter than the period X in the frame period in which the focal point detection signal and the image acquisition signal are read out.

A noise component such as 1/f noise becomes smaller as a period in which the inputs of the FD region 36, the operational amplifier 44, and the comparison circuit 46 are in a floating state is shorter. That is, the noise component superimposed on the (A+B) signal becomes smaller as the period corresponding to the period X or the period Z is shorter. For example, when a low-frequency noise expressed by a signal VDD is mixed in the signals in FIGS. 3 and 4, a noise signal Y remained after subtraction of the N signal from the S signal is smaller in FIG. 4. In addition, deterioration of image quality becomes large when the period corresponding to the period X or the period Z is long, due to the 1/f noise of the amplifier MOS transistor or a peripheral circuit, or a leakage current of the reset MOS transistor 30.

That is, the image acquisition signal is obtained based on the (A+B) signal read out in the frame period in which only the image acquisition signal is read out, whereby the noise component superimposed on the image acquisition signal can be decreased.

Next, a configuration example of a series of readout operations of the frame period in which the focal point detection signal and the image acquisition signal are read out, and of the frame period in which only the image acquisition signal is read out will be described with reference to FIGS. 5A and 5B.

Figure 5A:
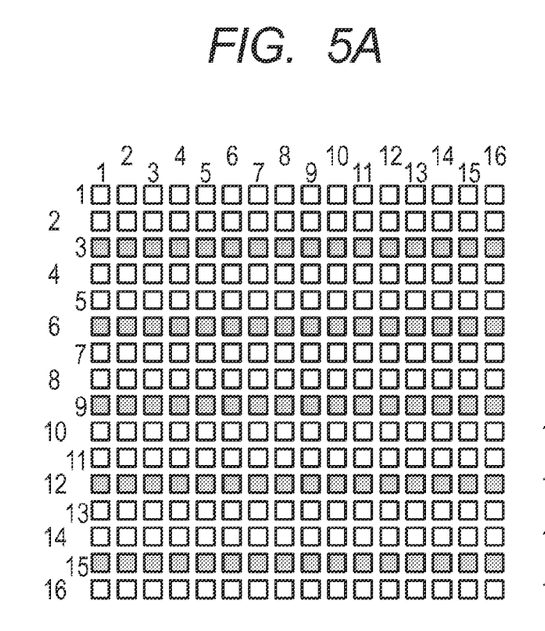
Figure 5B:
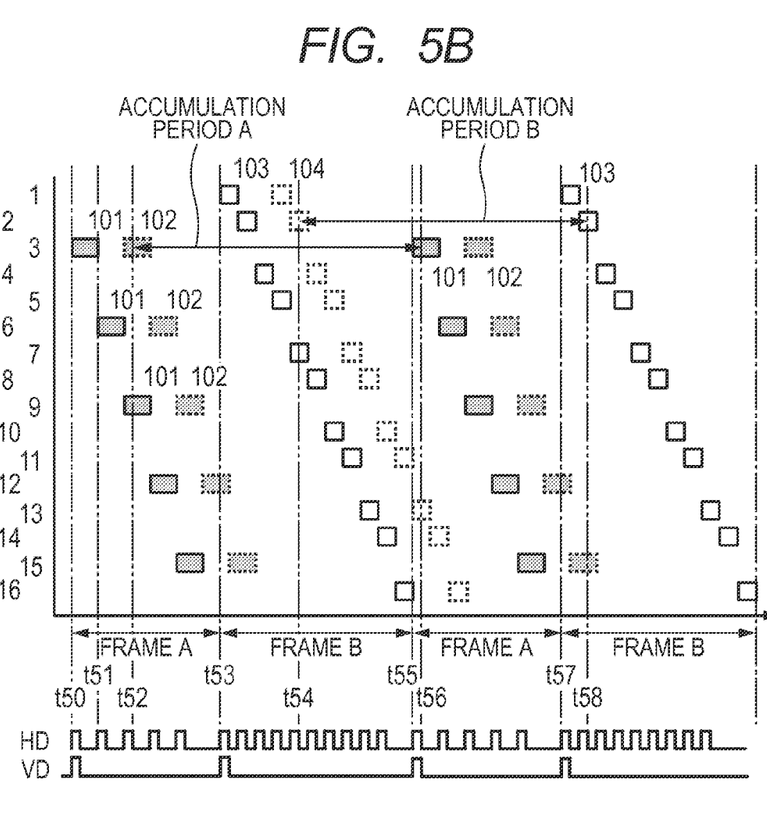

FIG. 5A is a plan view schematically illustrating the pixel array 10 including 16×16 pixels 20, and FIG. 5B is a timing chart illustrating an operation order of rows in the pixel array 10. In FIG. 5B, the horizontal axis represents time, and the vertical axis corresponds to a row position of the pixel array 10 of FIG. 5A.

In FIG. 5B, a period 101 is a period in which row scanning of reading out the focal point detection signal and the image acquisition signal of a plurality of pixels 20 included in a part of the pixel array 10 is performed, and corresponds to a period in which the operations of the timing chart illustrated in FIG. 3 are performed. A period 103 is a period in which row scanning of reading only the image acquisition signal of a plurality of pixels 20 included in a different part from the part of the pixel array 10 from which the signal is read out in the period 101 is performed, and corresponds to a period in which the operations of the timing chart illustrated in FIG. 4 are performed.

In FIG. 5B, a signal HD is an identification signal of a row, and when the signal HD becomes an H-level signal, readout is moved onto the next row. For example, when the signal HD becomes the H-level signal at time t50, the period 101 of readout of the 3rd row is started, and when next the signal HD becomes the H-level signal at time t51, the period 101 of readout of the 6th row is started. In this way, the 3rd, 6th, 9th, 12th, and 15th rows are sequentially extracted from the pixel array 10, and the row scanning for reading out the focal point detection signal and the image acquisition signal is performed. This frame period in which the focal point detection signal and the image acquisition signal are read out is hereinafter called "frame A."

Further, in FIG. 5B, a signal VD is a frame identification signal, and when the signal VD becomes an H-level signal, the operation is moved onto the next frame. For example, at time t50, when the signal VD becomes the H-level signal, readout of the frame A is started, and at time t53 when next the signal VD becomes the H-level signal, readout of the next frame is started.

In FIG. 5B, a period 102 is a reset period in which the electric charges accumulated in the photodiodes 22 and 26 are reset. To be specific, the transfer pulse signals PTX1 and PTX2, and the reset pulse signal PRES of a corresponding row are caused to be the H-level signals, so that the electric charges of the photodiodes 22 and 26 are reset. At this time, since the select pulse signal PSEL is the L-level signal, and thus the reset operation can be performed regardless of the readout period. For example, at time t52, while the 9th row is the readout period 101, the 3rd row is the reset period 102 of the photodiodes 22 and 26.

At time t53, when the signal VD becomes the H-level signal again, the operation is moved onto the frame in which only the image acquisition signal is read out. This frame period in which only the image acquisition signal is read out is hereinafter called "frame B." In row scanning in the frame B, the operations of the timing chart illustrated in FIG. 4 is performed in the period 103.

In the example of FIG. 5B, readout of 1st, 2nd, 4th, 5th, 7th, 8th, 10th, 11th, 13th, 14th, and 16th rows, which have not been performed in the frame A, is performed in the frame B. The readout operation of the frame B is terminated at time t55 at which the signal VD becomes the H-level signal next.

In FIG. 5B, a period 104 is a reset period of the rows from which only the image acquisition signal is read out, and a procedure of reset is similar to the procedure of the above-described period 102. After time t55 at which the readout of the frame B is terminated, the readout operation of the frame A and the readout operation of the frame B are repeated, similarly to the above description.

In doing so, the series of readout operations including the frame period in which the focal point detection signal and the image acquisition signal are read out, and the frame period in which only the image acquisition signal is read out can be realized.

Note that, in the technology described in Japanese Patent Application Laid-Open No. 2013-211833, when the N signal, the A signal, and the (A+B) signal are read out, both of information for the focal point detection and image information are obtained. Therefore, the read time from when the N signal is read out to when the (A+B) signal is read out becomes long, and a noise caused in the gate of the amplifier MOS transistor becomes large. This noise may become visible and deteriorate the image quality even if the noise is in an acceptable level in terms of the focal point detection, as an image signal severer on the noise.

In contrast, in the present embodiment, when the signals are read out in the order of the N signal→the A signal→the (A+B) signal, the (A+B) signal is not treated as the image information, and is used only for the purpose of acquisition of the focal point detection signal. When the image information is acquired, only the N signal and the (A+B) signal are read out, and the (A+B) signal having a smaller noise than the case where the signals are read out in the order of the N signal→the A signal→the (A+B) is used as the image information. Accordingly, the image quality can be improved, compared with the technology described in Japanese Patent Application Laid-Open No. 2013-211833.

Further, in the technology described in Japanese Patent Application Laid-Open No. 2013-211833, the readout of the N signal→the A signal→the (A+B) signal, and the readout of the N signal→the (A+B) signal are performed in the same frame period. In this case, the rows from which the N signal→the A signal→the (A+B) signal are read out, and the rows from which the N signal→the (A+B) signal are read out have different lengths of read time. Therefore, continuity of the accumulation periods is impaired. As a result, when an active object is captured, especially, when a moving image is captured, the image quality may be deteriorated, such as a case where a boundary of the object looks ragged. Further, it is necessary to switch the driving method in row units on the system. Therefore, readout may become complicated.

In contrast, in the present embodiment, the frame A in which the signals are read out in the order of the N signal→the A signal→the (A+B) signal, and the frame B in which the signals are read out in the order of the N signal→the (A+B) signal are separated. Therefore, continuity of the accumulation period can be secured. Accordingly, the ragged boundary of the object can be eliminated, and distortion of a moving body caused at the time of slit rolling shutter can be suppressed. Further, the switching of the driving method can be performed in frame units. Therefore, there is an effect of simplification of the system.

Further, the present embodiment is also characterized in that the rows for acquisition of the focal point detection information and the rows for acquisition of the image information are separated. That is, so-called thinned-out rows of an image are allocated to the rows for acquisition of the focal point detection information. Therefore, the accumulation period can be independently set between the image region and the focal point detection region.

Further, in the driving method of the present embodiment, the period of the frame A and the accumulation period of the readout rows in the frame B (accumulation period B) can be temporally overlapped. Similarly, the period of the frame B and the accumulation period of the readout rows in the frame A (accumulation period A) can be temporally overlapped. In the present embodiment, the readout operation and the accumulation period can be multiplexed. Therefore, the accumulation period of each row can be easily set, and a favorable image with high continuity can be obtained.

As described above, according to the present embodiment, in the imaging device including a plurality of pixels provided with a pair of photoelectric conversion units, both of the focal point detection signal and the image acquisition signal can be easily read out without deteriorating the image quality.

Second Embodiment

A method of driving an imaging device according to a second embodiment of the present invention will be described with reference to FIG. 6. Similar configuration elements to the imaging device and the method of driving the imaging device according to the first embodiment illustrated in FIGS. 1 to 5B are denoted with the same reference signs, and description is omitted or briefly described.

Figure 6:
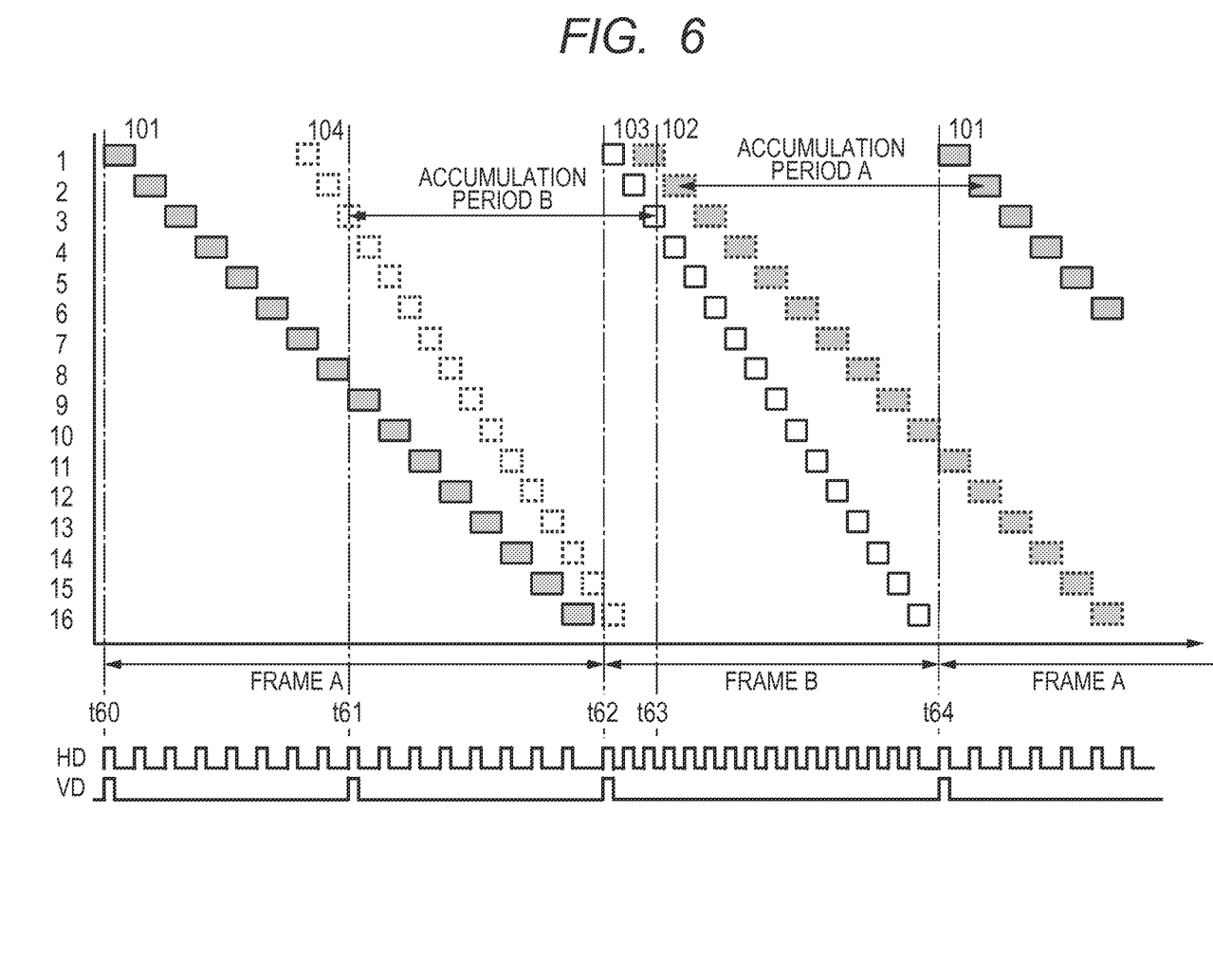
FIG. 6 is a timing chart illustrating a method of driving an imaging device according to a second embodiment of the present invention.

FIG. 6 is a timing chart illustrating a method of driving an imaging device according to the present embodiment.

In the present embodiment, another method of driving the imaging device according to the first embodiment illustrated in FIGS. 1 to 2B will be described.

The method of driving the imaging device according to the present embodiment performs readout of a frame A and readout of a frame B according to the timing chart illustrated in FIG. 6. In FIG. 6, a period 101 is a period in which row scanning of reading out a focal point detection signal and an image acquisition signal is performed, and corresponds to a period in which the operations of the timing chart illustrated in FIG. 3 is performed. A period 102 is a reset period of rows from which the focal point detection signal and the image acquisition signal have been read out. A period 103 is a period in which row scanning of reading only the image acquisition signal is performed, and corresponds to a period in which the operations of the timing chart illustrated in FIG. 4 is performed. A period 104 is a reset period of rows from which only the image acquisition signal has been read out.

In the method of driving the imaging device according to the present embodiment, as illustrated in FIG. 6, the focal point detection signal is read out from pixels of all of rows in a period of the frame A (time t60 to t62). Further, the image acquisition signal is read out from pixels of all of rows in a period of the frame B (time t62 to t64).

In this case, similarly to the case of the first embodiment, the readout of the row scanning in the frame B can be performed in a shorter period than the readout of the focal point detection signal in the frame A. Therefore, a favorable image with small noise effect can be obtained.

Further, in the driving method of the present embodiment, the period of the frame A and the accumulation period of readout rows in the frame B (accumulation period B) can be temporally overlapped. Similarly, the period of the frame B and the accumulation period of readout rows in the frame A (accumulation period A) can be temporally overlapped. Accordingly, a favorable image with high continuity can be obtained.

As described above, according to the present embodiment, in the imaging device including a plurality of pixels provided with a pair of photoelectric conversion units, both of the focal point detection signal and the image acquisition signal can be easily read out without deteriorating the image quality.

Third Embodiment

A method of driving an imaging device according to a third embodiment of the present invention will be described with reference to FIG. 7. Similar configuration elements to the imaging device and the method of driving the imaging device according to the first embodiment illustrated in FIGS. 1 to 5B are denoted with the same reference signs, and description is omitted or briefly described.

Figure 7:
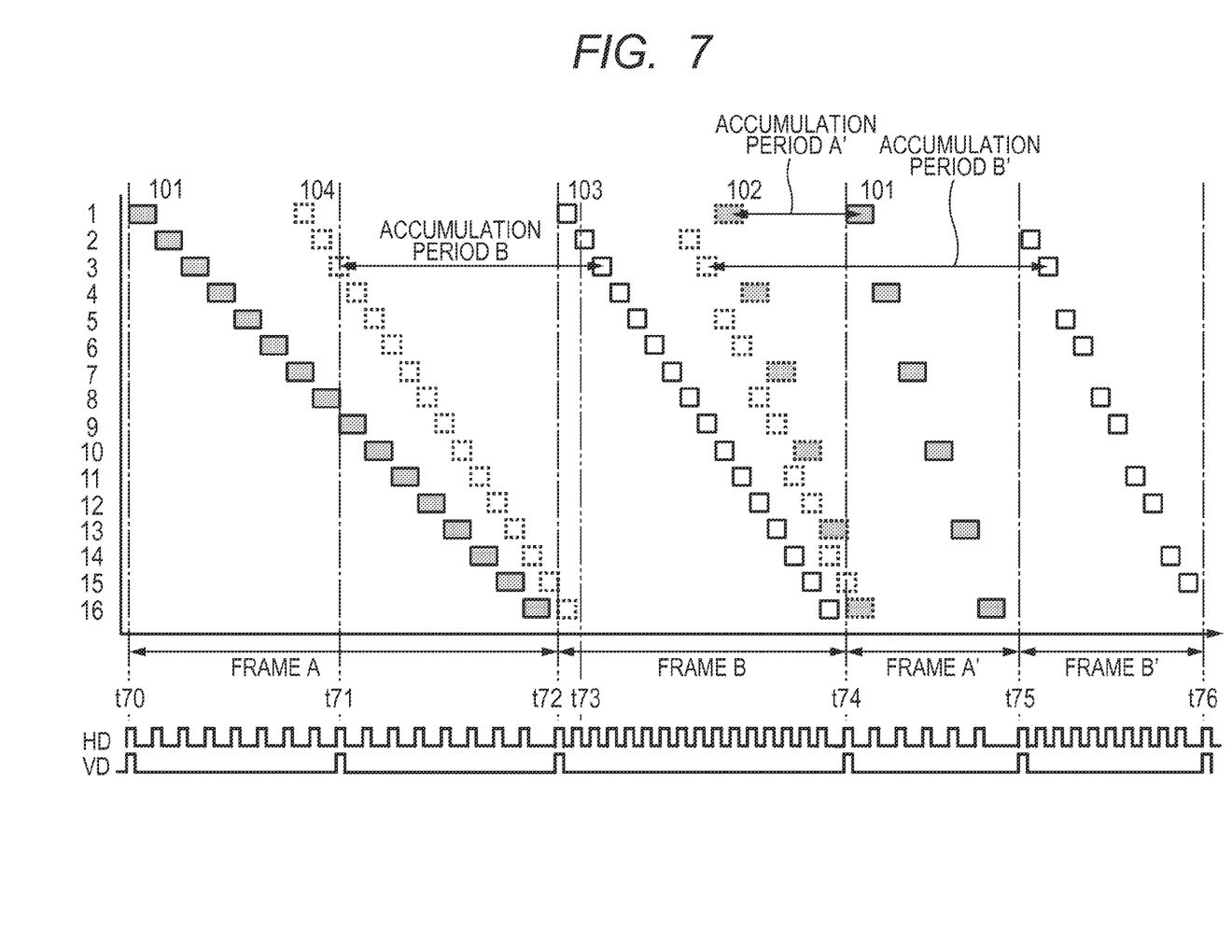
FIG. 7 is a timing chart illustrating a method of driving an imaging device according to a third embodiment of the present invention.

FIG. 7 is a timing chart illustrating a method of driving an imaging device according to the present embodiment.

In the present embodiment, another method of driving the imaging device according to the first embodiment illustrated in FIGS. 1 to 2B will be described.

The method of driving the imaging device according to the present embodiment performs readout of a frame A, readout of a frame B, readout of a frame A', and readout of a frame B' according to the timing chart illustrated in FIG. 7. In FIG. 7, a period 101 is a period in which row scanning of reading out a focal point detection signal and an image acquisition signal is performed, and corresponds to a period in which the operations of the timing chart illustrated in FIG. 3 is performed. A period 102 is a reset period of readout rows of the focal point detection signal and the image acquisition signal. A period 103 is a period in which row scanning of reading out only the image acquisition signal is performed, and corresponds to a period in which the operations of the timing chart illustrated in FIG. 4 is performed. A period 104 is a reset period of readout rows of only the image acquisition signal.

In the method of driving the imaging device according to the present embodiment, as illustrated in FIG. 7, the focal point detection signal is read out from pixels of all of rows in a period (time t70 to t72) of the frame A. Further, the image acquisition signal is read out from the pixels of all of rows in a period (time t72 to t74) of the frame B. In this case, similarly to the case of the second embodiment, the readout of the row scanning in the frame B can be performed in a shorter period than the readout of the focal point detection signal in the frame A. Therefore, a favorable image with small noise effect can be obtained.

Further, in the method of driving the imaging device according to the present embodiment, rows are thinned out and the readout is performed in a period (time t74 to t75) of the frame A' following the frame B, and a period (time t75 to t76) of the frame B' following the frame A'. That is, in the frame A', the focal point detection signal is read out from the 1st, 4th, 7th, 10th, 13th, and 16th rows. Further, in the frame B', the image acquisition signal is read out from the 2nd, 3rd, 5th, 6th, 8th, 9th, 11th, 12th, 14th, and 15th rows. In this way, even if a thinning-out rate of the rows is changed and the readout is performed, readout with small noise effect can still be performed.

Further, in the driving method of the present embodiment, the period of the frame A and the accumulation period of readout rows in the frame B (accumulation period B) can be temporally overlapped. Similarly, the period of the frame B and the accumulation period of readout rows in the frame A (accumulation period A) can be temporally overlapped. Accordingly, a favorable image with high continuity can be obtained. The same applies to the period of the frame A' and the accumulation period B', and the period of the frame B' and the accumulation period A'.

Further, in the present embodiment, a case of performing the thinning out operation in the periods of the frame A' and the frame B' has been described. However, an operation to add and read out signals of a plurality of pixels, and an operation to cut out and read out a part of a region of the pixel array 10 can obtain a similar effect.

As described above, according to the present embodiment, in the imaging device including a plurality of pixels provided with a pair of photoelectric conversion units, both of the focal point detection signal and the image acquisition signal can be easily read out without deteriorating the image quality.

Fourth Embodiment

An imaging system according to a fourth embodiment of the present invention will be described with reference to FIG. 8. Similar configuration elements to the imaging device and the method of driving the imaging device according to the first to third embodiments illustrated in FIGS. 1 to 7 are denoted with the same reference signs, and description is omitted or briefly described.

Figure 8:
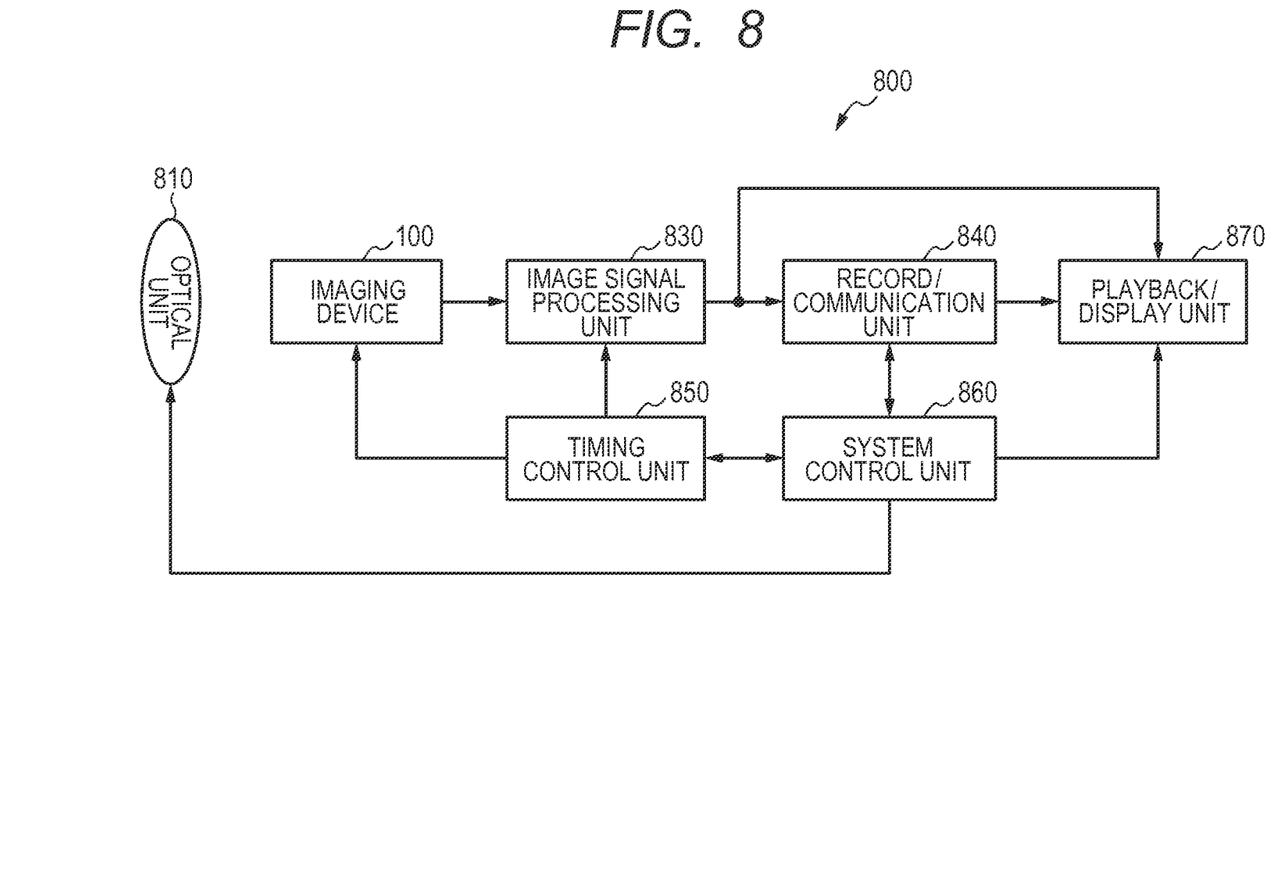
FIG. 8 is a schematic diagram illustrating a configuration of an imaging system according to a fourth embodiment of the present invention.

FIG. 8 is a schematic diagram illustrating a configuration of an imaging system according to the present embodiment.

An imaging system 800 according to the present embodiment includes, for example, an optical unit 810, an imaging device 100, an image signal processing unit 830, a record/communication unit 840, a timing control unit 850, a system control unit 860, and a playback/display unit 870. As the imaging device 100, the imaging device 100 described in the embodiments above is used.

The optical unit 810 that is an optical system such as a lens images light from an object on a pixel array 10, in which a plurality of pixels 20 is arranged in a two-dimensional matrix manner, of the imaging device 100, and forms an image of the object. The imaging device 100 outputs a signal according to the light imaged on the pixel array 10 at timing based on a signal from the timing control unit 850. The signal output from the imaging device 100 is input to the image signal processing unit 830, and the image signal processing unit 830 performs signal processing according to a method determined by a program or the like. A signal obtained by the processing in the image signal processing unit 830 is transmitted to the record/communication unit 840, as image data. The record/communication unit 840 transmits a signal for forming an image to the playback/display unit 870 to cause the playback/display unit 870 to playback/display a moving image or a still image. Further, the record/communication unit 840 performs communication with the system control unit 860 upon receipt of the signal from the image signal processing unit 830, and also performs an operation to record the signal for forming an image on a recording medium (not illustrated).

The system control unit 860 totally controls an operation of the imaging system, and controls driving of the optical unit 810, the timing control unit 850, the record/communication unit 840, and the playback/display unit 870. Further, the system control unit 860 includes, for example, a storage device as a recording medium (not illustrated), and records programs and the like, which are necessary for controlling the operation of the imaging system, in the recording medium. Further, the system control unit 860 supplies a signal that switches a drive mode according to an operation of a user or the like to an inside of the imaging system. Specific examples include change of a row to be read out or row to be reset, change of an angle of view associated with electronic zoom, and shift of the angle of view associated with vibration proof. The timing control unit 850 controls drive timing of the imaging device 100 and the image signal processing unit 830, based on the control of the system control unit 860.

The imaging system 800 performs the focal point detection, based on the A signal and the (A+B) signal described in the above embodiments. Further, an image may be formed using only the (A+B) signal obtained in the frame B without using the (A+B) signal obtained in the frame A.

As described above, the imaging system is configured from the imaging device according to the first to third embodiments, whereby a high-performance imaging system can be realized.

[Modification]

The present invention is not limited to the above-described embodiments, and various modifications can be made.

For example, in the first embodiment, readout of (3n+1)-th rows is performed in the frame A, and readout of (3n+2)-th rows and 3n-th rows is performed in the frame B, where n is an integer of 0 or more. However, selection of rows to be read out in each frame is not limited to the embodiment. The same applies to the frame A' and the frame B' of the third embodiment.

Further, in the above-described embodiments, a case in which the focal point detection signal and the image acquisition signal are read out in the frame A in the procedure illustrated in FIG. 3 has been described. However, in the period of the frame A, the readout of the image acquisition signal is not essential, and at least only the focal point detection signal may just be detected.

Therefore, the signals of the photodiode 22 and the photodiode 26 may be respectively read out as the A signal and the B signal, instead of the readout of the A signal and the (A+B) signal as illustrated in FIG. 3. Both of the (A+B) signal and the B signal can be said to be at least signals based on the signal electric charge generated in the photodiode 26, or signals that reflect the signal electric charge generated in the photodiode 26.

As a specific readout method in that case, for example, causing the reset pulse signal PRES to become the high-level signal, and resetting the input node of the amplifier MOS transistor 32 during time t19 to t20 in the operations illustrated in FIG. 3 can be considered. In this case, the signal component based on the photodiode 22 is reset, and thus the signal subjected to AD conversion from time t22 to t24 is only the signal component based on the photodiode 26. This signal serves as the B signal.

Note that the N signal caused by resetting of the input node of the amplifier MOS transistor 32 prior to readout of the B signal is different from the N signal caused at time t12. Therefore, the N signal caused this time is also subjected to AD conversion, and a difference between the N signal and the B signal is taken, whereby the noise can be decreased. However, speeding up of the operation may be preferentially performed without performing the readout of the N signal caused before the readout of the B signal in view of the fact that an S/N ratio of an image signal is not required for the signal used only for the focal point detection.

Further, in the above-described embodiments, a case in which the operation of the frame B is performed after the operation of the frame A is performed has been described. However, the operation of the frame A may be performed after the operation of the frame B is performed. In this case, a similar effect to the above embodiments can be obtained.

Further, in the above-described embodiment, a case in which a digital output sensor with an AD converter is used as the signal processing circuit 40 has been described. However, an analog output sensor may be used instead of the digital output sensor. With the analog output sensor, time to read signals from the N signal to the (A+B) signal also differs depending on whether the A signal is read out as long as the system to read out the N signal, the A signal, and the (A+B) signal is employed. Therefore, a similar effect to the above embodiments can be obtained.

Further, in the first to third embodiments, the noise component is removed by acquisition of the output signal based on the reset electric potential and performing of the correlated double sampling. However, the correlated double sampling is not necessarily performed.

Further, in the above-described embodiments, a case in which the number of the photoelectric conversion units (photodiodes) included in one pixel is two has been described. However, the number is not necessarily two as long as it is two or more. Further, the configuration of the in-pixel readout circuit is not limited to the configuration illustrated in FIG. 1.

Further, an imaging system to which the imaging device according to the first to third embodiments is applicable is not limited to the imaging system described in the fourth embodiment, and the imaging device can be widely applied to various imaging systems using an imaging device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-106770, filed May 23, 2014, which is hereby incorporated by reference herein in its entirety.

What is claimed is:

1. A method of driving an imaging device including a pixel array in which a plurality of pixels is arranged, each of the pixels including a first photoelectric conversion unit, a second photoelectric conversion unit, and a micro lens that collects incident light to the first photoelectric conversion unit and the second photoelectric conversion unit, the method comprising:

reading out a first signal based on a signal electric charge generated in the first photoelectric conversion unit, and a second signal based on a signal electric charge generated in at least the second photoelectric conversion unit, from each of a plurality of pixels included in a part of the pixel array, in a first frame period; and reading out a third signal based on the signal electric charge generated in the first photoelectric conversion unit and the signal electric charge generated in the second photoelectric conversion unit, from each of a plurality of pixels included in another part of the pixel array, and from which the first and second signals have not been read out in the first frame period, in a second frame period other than the first frame period.

2. The method of driving an imaging device according to claim 1, wherein at least a part of the first frame period and at least a part of an accumulation period of the signal electric charges in the first photoelectric conversion unit and the second photoelectric conversion unit of the pixels read out in the second frame period, and/or at least a part of the second frame period and at least a part of an accumulation period of the signal electric charges in the first photoelectric conversion unit and the second photoelectric conversion unit of the pixels read out in the first frame period, are overlapped.

3. The method of driving an imaging device according to claim 1, wherein a period of row scanning of each row in the second frame period is shorter than a period of row scanning of each row in the first frame period.

4. The method of driving an imaging device according to claim 1, wherein the second signal is based on a sum of the signal electric charge generated in the first photoelectric conversion unit and the signal electric charge generated in the second photoelectric conversion unit.

5. The method of driving an imaging device according to claim 1, wherein the second signal is based on the signal electric charge generated only in the second photoelectric conversion unit.

6. An imaging device comprising:

a pixel array in which a plurality of pixels is arranged, each of the pixel including a first photoelectric conversion unit, a second photoelectric conversion unit, and a micro lens that collects incident light to the first photoelectric conversion unit and the second photoelectric conversion unit; and a scanning circuit configured to execute:

a first frame period in which a first signal based on a signal electric charge generated in the first photoelectric conversion unit, and a second signal based on a signal electric charge generated in at least the second photoelectric conversion unit are read out from each of a plurality of pixels included in a part of the pixel array, and a second frame period other than the first frame period, and in which a third signal based on the signal electric charge generated in the first photoelectric conversion unit and the signal electric charge generated in the second photoelectric conversion unit is read out from each of a plurality of pixels included in another part of the pixel array, and from which the first and second signals have not been read out in the first frame period.

7. The imaging device according to claim 6, wherein the scanning circuit is further configured to execute an accumulation period such that at least a part of the first frame period and at least a part of the accumulation period of the signal electric charges in the first photoelectric conversion unit and the second photoelectric conversion unit of the pixels read out in the second frame period, and/or at least a part the second frame period and at least a part of the accumulation period of the signal electric charges in the first photoelectric conversion unit and the second photoelectric conversion unit of the pixels read out in the first frame period, are overlapped.

8. The imaging device according to claim 6, wherein a period of row scanning of each row in the second frame period is shorter than a period of row scanning of each row in the first frame period.

9. An imaging system comprising:

the imaging device according to claim 6; and a signal processing unit configured to perform processing of a signal output by the imaging device.

10. The imaging system according to claim 9, wherein the signal processing unit performs focal point detection, based on the first signal and the second signal acquired in the first frame period.

11. The imaging system according to claim 10, wherein the signal processing unit forms an image, based on only the third signal acquired in the second frame period.

* * * * *